Aug. 14, 1962 B. E. HOOPER 3,049,711

OMNI-DIRECTIONAL PORTABLE ANTENNA

Filed Nov. 12, 1958

INVENTOR:
Brian E. Hooper

By Smyth & Roston
Attorneys

United States Patent Office 3,049,711
Patented Aug. 14, 1962

3,049,711
OMNI-DIRECTIONAL PORTABLE ANTENNA

Brian E. Hooper, Sherman Oaks, Calif., assignor to Packard-Bell Electronics Corporation, Los Angeles, Calif., a corporation of California Filed Nov. 12, 1958, Ser. No. 773,480
9 Claims. (Cl. 343—702)

This invention relates to an omni-directional antenna, and more particularly to apparatus for using a tuned coil and a printed circuit magnetically and capacitively coupled to the coil to transmit signals on an omni-directional basis.

In many applications, it is desired to transmit signals so that the signals are effective at every position within a limited distance of the transmitter. For example, it may be desired to transmit signals toward a television receiver from any position within the room housing the receiver so as to control the operation of the receiver on a remote basis. By way of illustration, these signals may operate controls to change the channel being received at any instant or to turn the set on and off. The signals should preferably have an omni-directional pattern since a viewer should not be forced to orient himself or the transmitter in any particular manner relative to the receiver in order to provide a proper transmission of signals for obtaining a remote control over the operation of the receiver.

Various attempts have been made to provide an omni-directional antenna for transmission over limited areas such as within a room housing a television receiver. These attempts have not been entirely successful for several reasons. One reason has been that antennas having omni-directional characteristics have generally been quite complex from the standpoint of construction and quite bulky in size. A concurrent disadvantage has been that the omni-directional antennas have been quite expensive. These disadvantages have been especially troublesome in such uses as the remote control of a television receiver since the remote control unit, including the antenna, should be small enough to fit comfortably within the hand of a television viewer and should be fairly inexpensive.

This invention provides an omni-directional antenna which overcomes the above disadvantages. The antenna includes a first coil which may be helically wound and which may be used as the tuned coil in an oscillator as well as an antenna. The invention further includes a second coil which is disposed as a printed circuit on a paper and which is magnetically coupled to the first coil. A capacitance is also formed as a printed circuit on the paper by printing plates on opposite sides of the paper. The first coil is capacitively coupled to the capacitance by its disposition in contiguous relationship to one of the plates in the capacitance so that the energy in the tuned circuit, including the first coil, is coupled capacitively to the capacitance formed on the paper.

In this way, energy from the first tuned circuit is transferred both capacitively and magnetically to a second tuned circuit formed by the second coil and the capacitance printed on the paper. By disposing the second coil in transverse relationship to the first coil and using the second coil as an antenna, any gaps in the directional transmission of energy by the first coil are filled by the second coil.

Figure 2:
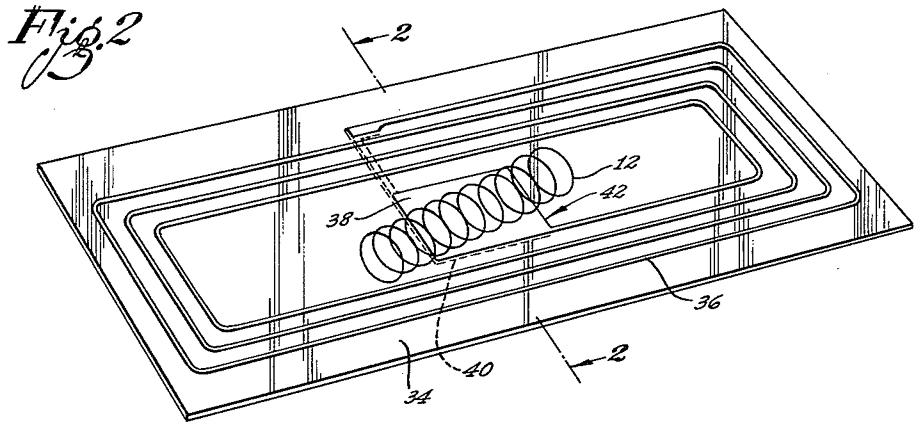
FIGURE 2 is a perspective view of certain members shown in FIGURE 1 and particularly illustrates the relative disposition of the first and second coils and the construction of these coils.
Figure 3:
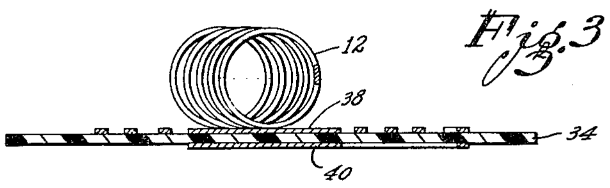
Figure 4:
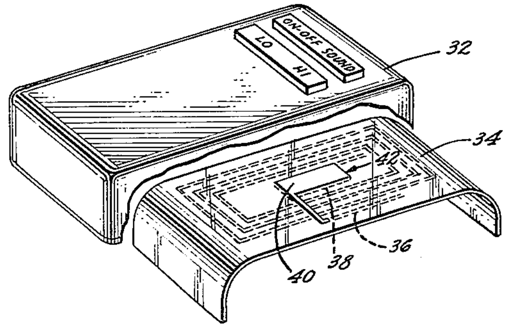

FIGURE 3 is a sectional view substantially on the line 2—2 of FIGURE 2 and further illustrates the construction and relative disposition of the two coils which are included to provide an omni-directional radiation of electrical energy; and FIGURE 4 is a partially exploded view illustrating the disposition of the second coil as a printed circuit on a flexible paper and further illustrating the disposition of the paper relative to a casing for housing the coils.

In one embodiment of the invention, an oscillator generally indicated at 10 may include a coil 12 which serves as the inductance in a tuned circuit and which also serves as an antenna. The coil 12 may be included in parallel with a capacitance 14 to form the tuned circuit for controlling the frequency of the oscillatory signals produced by the oscillator 10. The oscillator 10 may also include a semiconductor such as a transistor 16 having its collector connected to first terminals in the coil 12 and the capacitance 14.

A resistance 20 and a capacitance 22 may be disposed in parallel between the base of the transistor 16 and second terminals of the coil 12 and the capacitance 14. A source of direct voltage, such as a battery 24, and a capacitance 26 are in parallel, with the positive terminal of the battery and one terminal of the capacitance being connected to the emitter of the transistor 16. The negative terminal of the battery 24 and the second terminal of the capacitance 26 are connected to one terminal of a resistance 28 having its second terminal connected to the collector of the transistor 16. A resistance 30 has a first terminal common to an intermediate tap and the first end terminal of the coil 12 and has a second terminal connected to the emitter of the transistor 16.

Figure 1:
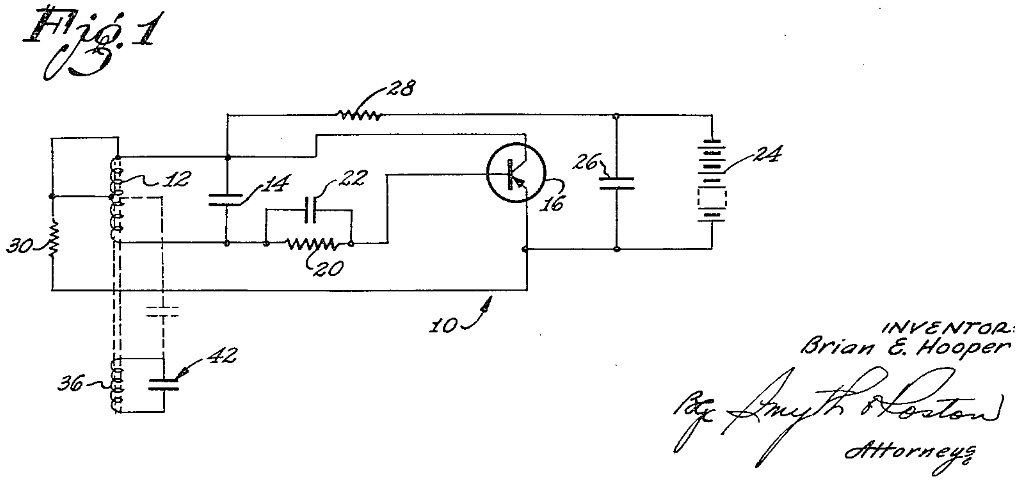
FIGURE 1 is a circuit diagram of the electrical features constituting this invention and includes a showing of first and second coils for providing a transmission of electrical energy on an omni-directional basis.

The electrical circuitry shown in FIGURE 1 and including the coil 12 is disposed within a casing 32 which may be made from a suitable dia-magnetic material, such as a plastic. The casing 32 is dia-magnetic so that the coil 12 may be used as an antenna to transmit electrical energy through the casing to members removed from the casing and responsive to the transmitted energy. The coil 12 is disposed within the casing 32 so as to rest against a thin sheet of paper 34 having properties of electrical insulation and having dia-magnetic properties. As will be seen in FIGURE 4, the paper 34 is provided with properties of flexure so that it may be bent to conform in shape to the casing 32 when disposed against the casing.

Printed circuitry is formed on the paper 34 so as to be in substantially flush relationship with the paper. The printed circuitry includes a plurality of turns of electrically conductive material helically disposed in a single plane to form a coil 36. It should be appreciated that any number of turns and even only one turn can be provided on the coil 36 in accordance with the use desired. At its inner end, the coil 36 terminates in an electrically conductive plate 38 which is also flush with the paper 34 and which preferably has a rectangular periphery. A second plate 40 is disposed on the opposite side of the paper 34 from the plate 38 and in flush relationship with the paper and in coupled relationship to the plate 38. Since the plates 38 and 40 are separated by material having dielectric properties such as the paper 34, the plates 38 and 40 form a capacitance 42. The dimensions of the plates 38 and 40 are chosen so that the capacitance 42 is resonant with the coil 36 at a frequency corresponding to the resonant frequency of the tuned circuit formed by the coil 12 and the capacitance 14.

The oscillator 10 shown in FIGURE 1 is adapted to produce signals at a particular frequency dependent in large part upon the resonant frequency of the coil 12 and the capacitance 14. The production of oscillatory signals is facilitated by the feedback of energy provided from the collector to the base of the transistor 16 as a result of the connections to the intermediate tap in the coil 12. The oscillatory signals obtained from the stage 10 are transmitted by the coil 12 through the casing 32 to members removed from the casing. These signals have a blind spot in a direction corresponding to the axis of the coil 12.

The energy linking the coil 12 is transferred to the tuned circuit formed by the coil 36 and the capacitance 42. This transfer results in part because of the disposition of the coils 12 and 36 in contiguous and transverse relationship to each other. The transfer of energy is also obtained because of the capacitive coupling between the coil 12 and the plate 38. It should be understood, of course, that a dielectric (not shown) is between the surface of plate 38 and the adjacent turns of coil 12. It is obvious that this material, for example, may be any one or a combination of air, the insulation applied to the wire of coil 12, or an insulative coating disposed over the surface of capacitor plate 38. This transfer of energy occurs on an optimum basis since the tuned circuit formed by the coil 36 and the capacitance 42 has a resonant frequency corresponding to that obtained from the tuned circuit which is formed by the coil 12 and the capacitance 14.

Since the coil 36 is disposed in transverse relationship to the coil 12, it transmits energy in directions which include the blind direction of the coil 12. This blind direction occurs substantially along the axis of the coil 12. Actually, the energy transmitted by the coil 36 has an optimum intensity in the blind direction of the coil 12, especially when the coils 12 and 36 are disposed in perpendicular relationship to each other as in the embodiment shown in the drawings. In this way, an omni-directional radiation of energy is obtained.

The apparatus constituting this invention has certain important advantages. It obtains an omni-directional radiation of energy by including two coils, one of which is formed from a printed circuit. By using a printed circuit to form one of the coils, the space and complexity of the omni-directional antenna is minimized. The efficiency as to the transfer of energy between the two coils is also considerably increased by disposing a pair of plates on opposite sides of the paper in the form of a printed circuit and by obtaining a capacitive coupling between at least one of the plates and the first one of the two coils. This is especially advantageous when the first coil is included in a first tuned circuit with a first capacitance and when the second coil and a capacitance formed as a result of the printed circuits are included in a second tuned circuit which is resonant at the same frequency as the first tuned circuit.

It should be appreciated that the oscillator shown in FIGURE 1 is included only by way of example and that the invention may also be used in other oscillators. For example, the features constituting this invention are disclosed in copending application Serial No. 766,436, filed October 10, 1958, by me as being included in an oscillator different from that shown in FIGURE 1. It should also be appreciated that the features constituting this invention may be included in other types of circuitry than oscillators without departing from the scope of the invention.

I claim:

1. In combination for transmitting signals on an omni-directional basis, a casing made from a dia-magnetic material, a first coil disposed within the casing for the radiation of energy, a first capacitance connected with the coil in a tuned circuit resonant at a particular frequency, a thin sheet of dielectric material having properties of flexure and disposed in a contiguous and transverse relationship to the first coil within the casing, a first printed circuit formed on one side of the thin sheet of dielectric material and disposed in a plurality of turns to form a second coil for the radiation of energy in transverse relationship to the first coil and terminating at one end in a first plate capacitively coupled to the first coil, and a second printed circuit formed on the second side of the thin sheet and including a second plate forming a second capacitance with the first plate, the second coil and the second capacitance being provided with characteristics to form a tuned circuit resonant at the particular frequency, said first coil having an elongate shape and extending in the direction of its longitudinal axis along said thin sheet of dielectric material proximate to said first printed circuit.

2. In combination for transmitting signals on an omni-directional basis, a casing made from a dia-magnetic material, a first coil disposed within the casing and provided with a plurality of helically wound turns, a first capacitance connected to the first coil to form a first tuned circuit resonant at a particular frequency, a thin sheet of dielectric material disposed within the casing against the walls of the casing to follow the contours of the walls, a first printed circuit disposed on one side of the dielectric sheet in substantially flush relationship to the sheet and formed as a second coil with a plurality of turns having a helical configuration and having a substantially contiguous relationship to the first coil to provide for a magnetic coupling between the coils and also having an axis perpendicular to the axis of the first coil, the first printed circuit being further formed in a first plate extending from the second coil on the same side of the sheet as the second coil and disposed in substantially flush relationship to the sheet and in capacitively coupled relationship to the first coil, a second printed circuit disposed on the opposite side of the dielectric sheet in substantially flush relationship to the sheet and in coupled relationship to the first plate to form a second capacitance resonant at the particular frequency with the second coil, and electrical circuitry coupled to the first coil for introducing energy at the particular frequency to the first coil for transmission by the first and second coils, said first coil having an elongate shape and extending in the direction of its longitudinal axis along said thin sheet of dielectric material proximate to said first printed circuit.

3. In combination for transmitting signals on an omni-directional basis, a casing made from a dia-magnetic material, a first coil disposed within the casing and provided with a plurality of helically wound turns forming a cylinder, a first capacitance connected to the first coil to form a first tuned circuit resonant at a particular frequency, a thin sheet of dielectric material disposed within the casing, a first printed circuit disposed on one side of the dielectric sheet in substantially flush relationship to the sheet and formed as a second coil with a plurality of turns having a helical configuration and having a substantially contiguous relationship to the first coil to provide for a magnetic coupling between the coils and also having an axis perpendicular to the axis of the first coil, the first printed circuit being further formed in a first plate extending from the second coil on the same side of the sheet as the second coil and disposed in substantially flush relationship to the sheet and in capacitively coupled relationship to the first coil, a second printed circuit disposed on the opposite side of the dielectric sheet in substantially flush relationship to the sheet and in coupled relationship to the first plate to form a second capacitance resonant at the particular frequency with the second coil, and electrical circuitry coupled to the first coil for introducing energy at the particular frequency to the first coil for transmission by the first and second coils, the plurality of turns of said second coil forming an unsymmetrical elongate shape on said one side of said dielectric sheet so that a maximum transmission of energy is provided in a direction at a predetermined angle from the maximum dimension of the elongate shape, said first coil being positioned in the casing with its longitudinal axis being aligned at the predetermined angle from the maximum dimension of the elongate shape of said second coil whereby energy is transmitted on an omni-directional basis, said first coil having an elongate shape and extending in in the direction of its longitudinal axis along said thin sheet of dielectric material proximate to said first printed circuit.

4. An antenna comprising: a first coil; means for mounting said first coil, said mounting means including at least a dielectric portion; first and second electrically-conductive plates connected to the extremities of the first coil, and disposed on the portion in mutual electrostatic relation to form a capacitor; and a second coil disposed in electrostatic relation with one of the plates and in electromagnetic relation to the first coil, so that a large percentage of an oscillatory electrical signal present in the second coil will be coupled reactively to the first coil.

5. An omni-directional antenna comprising: a first coil; means for mounting said first coil, said mounting means including at least a dielectric portion; first and second electrically-conductive plates connected to the extremities of the first coil, and disposed on the portion in mutual electrostatic relation to form a capacitor; and a second coil disposed in electrostatic relation with one of the plates and in electromagnetic and angular relation to the first coil, so that a large percentage of an oscillatory electrical signal present in the second coil will be coupled reactively to the first coil.

6. An omni-directional antenna comprising: a first coil; means for mounting said first coil, said mounting means including at least a dielectric portion; first and second electrically-conductive plates connected to the extremities of the first coil, and disposed on the portion in mutual electrostatic relation to form a capacitor; and a second coil disposed in electrostatic relation with one of the plates and in electromagnetic and perpendicular relation to the first coil, so that a large percentage of an oscillatory electrical signal present in the second coil will be coupled reactively to the first coil.

7. An omni-directional antenna comprising: a first coil; means for mounting said first coil, said mounting means including at least a dielectric portion; first and second electrically-conductive plates connected to the extremities of the first coil, and disposed on the portion in mutual electrostatic relation to form a capacitor; and a second coil disposed in perpendicular and electromagnetic relation to the first coil, said second coil further having a plurality of turns coupled in distributive electrostatic relation to one of the plates, so that a large percentage of an oscillatory electrical signal present in the second coil will be coupled reactively to the first coil.

8. An omni-directional antenna comprising: a sheet of dielectric material; first and second conductive plates disposed on opposite surface portions of the sheet to form a capacitor; a first coil disposed on the sheet, and having one lead coupled to the first plate and the other lead coupled to the second plate to form a first frequency-tuned radiating element; a helical coil disposed in transverse relation to the first coil, and coupled electromagnetically to the first coil and electrostatically to one of the plates; and another capacitor coupled in parallel relation with the helical coil to form a second radiating element tuned to the frequency of the first element.

9. An omni-directional antenna comprising: a sheet of dielectric material; first and second conductive plates disposed on opposite surface portions of the sheet to form a capacitor; a first coil disposed on the sheet, and having one lead coupled to the first plate and the other lead coupled to the second plate to form a first frequency-tuned radiating element; a helical coil disposed in transverse and mutually inductive relation to the first coil, and having a plurality of turns coupled electrostatically to one of the plates; and another capacitor coupled in parallel relation with the helical coil to form a second radiating element tuned to the frequency of the first element.

References Cited in the file of this patent

UNITED STATES PATENTS

| | | |
|---|---|---|
| 1,394,560 | Kolster | Oct. 25, 1921 |
| 2,250,370 | Grimes | July 22, 1941 |
| 2,266,630 | Forbes | Dec. 16, 1941 |
| 2,280,562 | Weagant | Apr. 21, 1942 |
| 2,474,988 | Sargrove | July 5, 1949 |

FOREIGN PATENTS

| | | |
|---|---|---|
| 522,207 | France | Mar. 23, 1921 |

OTHER REFERENCES

Kraus: Antenna, McGraw-Hill Book Co., Inc., 1950, page 174.

"The Radio Amateur's Handbook," 33rd edition, 1956, page 30.